US012697864B2

(12) United States Patent
Zhang et al.

(10) Patent No.: US 12,697,864 B2
(45) Date of Patent: Aug. 4, 2026

(54) HYBRID POWER SYSTEM AND HYBRID VEHICLE EQUIPPED WITH SAME

(71) Applicant: CHERY AUTOMOBILE CO., LTD., Wuhu (CN)

(72) Inventors: Wensen Zhang, Wuhu (CN); Yongfu Liu, Wuhu (CN); Chuanfei Xu, Wuhu (CN); Longfang Sun, Wuhu (CN); Xiang Li, Wuhu (CN)

(73) Assignee: CHERY AUTOMOBILE CO., LTD., Wuhu (CN)

( * ) Notice: Subject to any disclaimer, the term of this patent is extended or adjusted under 35 U.S.C. 154(b) by 0 days.

(21) Appl. No.: 18/875,510

(22) PCT Filed: Nov. 25, 2022

(86) PCT No.: PCT/CN2022/134437
§ 371 (c)(1),
(2) Date: Dec. 16, 2024

(87) PCT Pub. No.: WO2024/001014
PCT Pub. Date: Jan. 4, 2024

(65) Prior Publication Data
US 2026/0021695 A1      Jan. 22, 2026

(30) Foreign Application Priority Data
Jun. 28, 2022    (CN) .......................... 202210753220.6

(51) Int. Cl.
*B60K 6/387*          (2007.10)
*B60K 6/24*           (2007.10)
(Continued)

(52) U.S. Cl.
CPC ................ *B60K 6/387* (2013.01); *B60K 6/24* (2013.01); *B60K 6/26* (2013.01); *B60K 6/405* (2013.01); *B60K 6/442* (2013.01)

(58) Field of Classification Search
CPC . B60K 6/387; B60K 6/24; B60K 6/26; B60K 6/405; B60K 6/442
See application file for complete search history.

(56) References Cited

U.S. PATENT DOCUMENTS

| | | | |
|---|---|---|---|
| 10,328,929 B2 | 6/2019 | Yagasaki | |
| 2012/0198962 A1 | 8/2012 | Houle | |

(Continued)

FOREIGN PATENT DOCUMENTS

| | | |
|---|---|---|
| CN | 103527675 A | 1/2014 |
| CN | 103573850 A | 2/2014 |

(Continued)

OTHER PUBLICATIONS

International Search Report of the International Searching Authority for State Intellectual Property Office of the People's Republic of China in PCT application No. PCT/CN2022/134437 issued on Mar. 24, 2023, which is an international application to which this application claims priority.

(Continued)

*Primary Examiner* — Tisha D Lewis
(74) *Attorney, Agent, or Firm* — Kolitch Romano Dascenzo Gates LLP

(57) ABSTRACT

A hybrid power system includes a first clutch, a second clutch, an engine, a first motor, a second motor, and a power output assembly. Two ends of the first clutch are respectively connected to the first motor and the engine; two ends of the second clutch are respectively connected to the first clutch and the power output assembly. The second motor is connected to the power output assembly. The first clutch and the second clutch are disposed in a radial direction of an output shaft of the first motor, and the second clutch is disposed on a side, away from the output shaft of the first motor, of the first clutch

19 Claims, 9 Drawing Sheets

(51) Int. Cl.
    *B60K 6/26*        (2007.10)
    *B60K 6/405*     (2007.10)
    *B60K 6/442*     (2007.10)

(56)               References Cited

U.S. PATENT DOCUMENTS

| | | | |
|---|---|---|---|
| 2014/0228168 A1* | 8/2014 | Kaufman | B60W 20/13 |
| | | | 180/65.265 |
| 2017/0261043 A1 | 9/2017 | Chambrion et al. | |

FOREIGN PATENT DOCUMENTS

| | | | | |
|---|---|---|---|---|
| CN | 106795923 A | | 5/2017 | |
| CN | 207809033 U | * | 9/2018 | B60K 6/36 |
| CN | 109986949 A | | 7/2019 | |
| CN | 212177711 A | | 12/2020 | |
| CN | 114211950 A | | 3/2022 | |
| CN | 114987190 A | | 9/2022 | |
| DE | 102014217277 A1 | | 3/2016 | |
| DE | 102015225033 A1 | | 6/2017 | |
| JP | 2014020494 A | * | 2/2014 | F16D 25/0638 |
| RU | 2483941 C1 | | 6/2013 | |
| WO | WO2020127012 A1 | | 6/2020 | |

OTHER PUBLICATIONS

China National Intellectual Property Administration, First Office Action in Chinese Patent Application No. 202210753220.6 issued on Feb. 27, 2023, which is a foreign counterpart application corresponding to this U.S. Patent Application, to which this application claims priority.

\* cited by examiner

HYBRID POWER SYSTEM AND HYBRID VEHICLE EQUIPPED WITH SAME

CROSS-REFERENCE TO RELATED APPLICATION

This application is a U.S. national stage of international application No. PCT/CN2022/134437, filed on Nov. 25, 2022, which claims priority to Chinese Patent Application No. 202210753220.6, filed on Jun. 28, 2022 and entitled "HYBRID POWER SYSTEM AND HYBRID VEHICLE WITH SAME," the disclosures of which are herein incorporated by references in their entireties.

TECHNICAL FIELD

The present disclosure relates to the field of vehicle technologies, and in particular, relates to a hybrid power system and a hybrid electric vehicle equipped with the same.

BACKGROUND

With popularity of vehicles, vehicle exhaust emissions have become a primary source of urban air pollution. Thus, more new energy vehicles have entered the consumer market to reduce impacts of fuel vehicle exhaust emissions on the environment.

SUMMARY

Embodiments of the present disclosure provide a hybrid power system and a hybrid electric vehicle equipped with the same. The technical solutions are as follows.

In some embodiments of the present disclosure, a hybrid power system is provided. The hybrid power system includes: a first clutch, a second clutch, an engine, a first motor, a second motor, and a power output assembly; wherein two ends of the first clutch are respectively connected to the first motor and the engine; two ends of the second clutch are respectively connected to the first clutch and the power output assembly; and the second motor is connected to the power output assembly; wherein the first clutch and the second clutch are disposed in a radial direction of an output shaft of the first motor, and the second clutch is disposed on a side, away from the output shaft of the first motor, of the first clutch.

In some embodiments, the first clutch includes a first portion and a second portion, wherein the first portion and the second portion are controllably engaged or disengaged; and the second clutch includes a third portion and a fourth portion, wherein the third portion and the fourth portion are controllably engaged or disengaged; wherein the second portion of the first clutch is connected to the third portion of the second clutch.

In some embodiments, the second portion and the third portion are integrally connected.

In some embodiments, the first portion is sleeved on an output shaft of the engine, and one end of the second portion is sleeved on the output shaft of the first motor, and the other end of the second portion is disposed on a side, away from the output shaft of the engine, of the first portion and is engaged with the first portion; and the third portion is sleeved on the other end of the second portion, one end of the fourth portion is connected to the power output assembly, and the other end of the fourth portion is disposed on a side, away from the second portion, of the third portion and is engaged with the third portion.

In some embodiments, the output shaft of the first motor is a step shaft, wherein a diameter of a shaft head of the step shaft is less than a diameter of a shaft body of the step shaft, and the second portion is connected to the shaft head, such that at least part of the second portion is accommodated in an annular space surrounding the shaft head.

In some embodiments, the first portion is an inner hub of the first clutch, and the second portion is an outer hub of the first clutch; the third portion is an inner hub of the second clutch, and the fourth portion is an outer hub of the second clutch; wherein the outer hub of the first clutch and the inner hub of the second clutch are formed by respectively machining splines on an inner wall and an outer wall of a same hub sleeve.

In some embodiments, the splines on the inner wall of the same hub sleeve and the splines on the outer wall of the same hub sleeve are arranged in an opposing staggered configuration.

In some embodiments, the power output assembly includes a hollow shaft, wherein the hollow shaft is sleeved on an output shaft of the engine and is rotatable relative to the output shaft of the engine; a length of the hollow shaft is less than a length of the output shaft of the engine, such that an end of the output shaft of the engine protrudes from the hollow shaft and is connected to the first portion; and the fourth portion is connected to the hollow shaft.

In some embodiments, an output shaft of the first motor and an output shaft of the engine are coaxial and close to each other, and a gap is present between the output shaft of the first motor and the output shaft of the engine, wherein the gap is inside the first clutch and the second clutch.

In some embodiments, an axis of an output shaft of the second motor is parallel to an axis of the output shaft of the first motor, and a length of the output shaft of the second motor is greater than a length of the output shaft of the first motor.

In some embodiments, an overlapped region is present between an orthographic projection of the power output assembly on a first plane, an orthographic projection of the output shaft of the engine on the first plane, and an orthographic projection of the output shaft of the second motor on the first plane; and a space is present between the orthographic projection of the power output assembly on the first plane and an orthographic projection of the output shaft of the first motor on the first plane; wherein the first plane is a plane that runs through the axis of the output shaft of the first motor and is perpendicular to a vertical line between the axis of the output shaft of the second motor and an axis of the output shaft of the engine.

In some embodiments, the hybrid power system further includes: a housing; wherein the first motor, the second motor, the first clutch, and the second clutch are all disposed inside the housing, and an arrangement direction of the first motor and the second motor inside the housing is perpendicular to an axis of the output shaft of the first motor; and the engine is disposed outside the housing, and an output shaft of the engine includes a power output of the engine and a connection shaft detachably connected to the power output of the engine, wherein the connection shaft is disposed inside the housing and is rotatable relative to the housing, and part of the connection shaft protrudes from the housing.

In some embodiments of the present disclosure, a hybrid electric vehicle is provided. The hybrid electric vehicle includes the above hybrid power system.

BRIEF DESCRIPTION OF DRAWINGS

For clearer descriptions of the technical solutions according to the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

Figure 1:
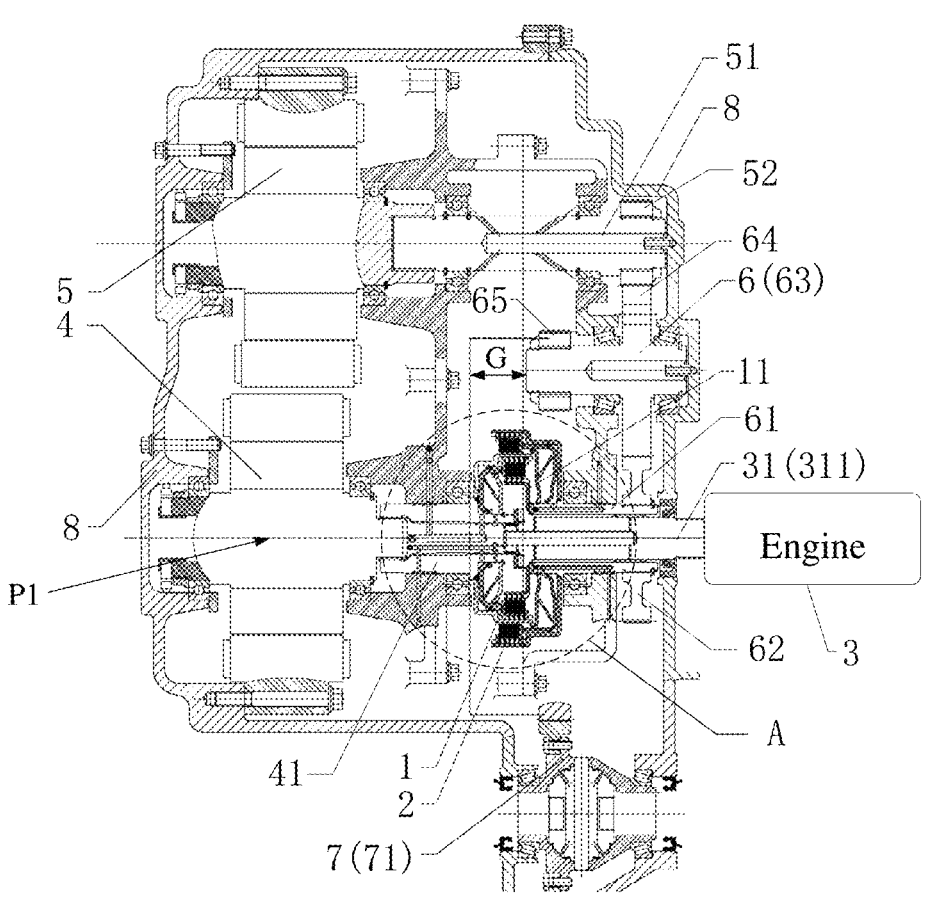
FIG. 1 is a local section view of a hybrid power system according to some embodiments of the present disclosure.

Detailed embodiments of the present disclosure are shown by the above accompanying drawings, and more detailed description are shown hereinafter. These drawings and descriptions are not intended to limit the scope of the concept of the present disclosure in any way, but rather to illustrate the conception of the present disclosure for those skilled in the art by specific embodiments.

DETAILED DESCRIPTION

The technical solutions according to the embodiments of the present disclosure are described clearly and completely hereinafter in combination with the accompanying drawings in the embodiments of the present disclosure. It is obvious that the described embodiments are merely part but not all of the embodiments of the present disclosure. All other embodiments derived by those skilled in the art without creative efforts based on the embodiments in the present disclosure are within the protection scope of the disclosure.

Hybrid electric vehicles have gradually gained the favor of the market due to superior energy saving and emission reduction and excellent user experience. Accordingly, demands for the hybrid power system are ever increasing on the market. Mainstream vehicle manufacturers are actively developing hybrid power systems, especially integrated development of dedicated hybrid power transmissions. However, most hybrid power transmissions on the market have low integration, large size, and complex structure, which are not conducive to vehicle layout.

Specifically, in some practices, the hybrid power system is mostly developed based on the traditional automatic transmission, and is formed by simply integrating a motor in a front or back end of the transmission, such as an automatic transmission (AT), an automated mechanical transmission (AMT), a continuously variable transmission (CVT), or a dual clutch transmission (DCT).

Such type of hybrid power system is widely used by many vehicle companies due to low research cost and low technical threshold. However, the hybrid power system has the following obvious disadvantages. First, the system integration is low, and the assembly size is large, which are not conducive to spatial layout and affect expansion of the power of the motor and the overall power performance of the vehicle. Second, in the case that the engine is started by the motor, the engine and wheels are not decoupled, such that an impact is generated in switching modes, and the driving comfort is affected; and in the case that the engine is started by the traditional starter, the starting time is long, and the starting noise is loud. Third, the traditional hybrid transmission does not have an extended range mode, such that after combination, only a few operating modes are supported, and thus the fuel saving effect is poor.

Some embodiments of the present disclosure provide a hybrid power system to improve the above defects of the hybrid power system in some practices. The hybrid power system has high integration and compact structure, such that layout space is greatly saved; the engine and wheels are decoupled, such that the impact generated in switching modes is avoided; and the hybrid power system supports a plurality of operating modes to meet different operating requirements in different operation situations, such that the fuel saving effect is improved.

Figure 2:
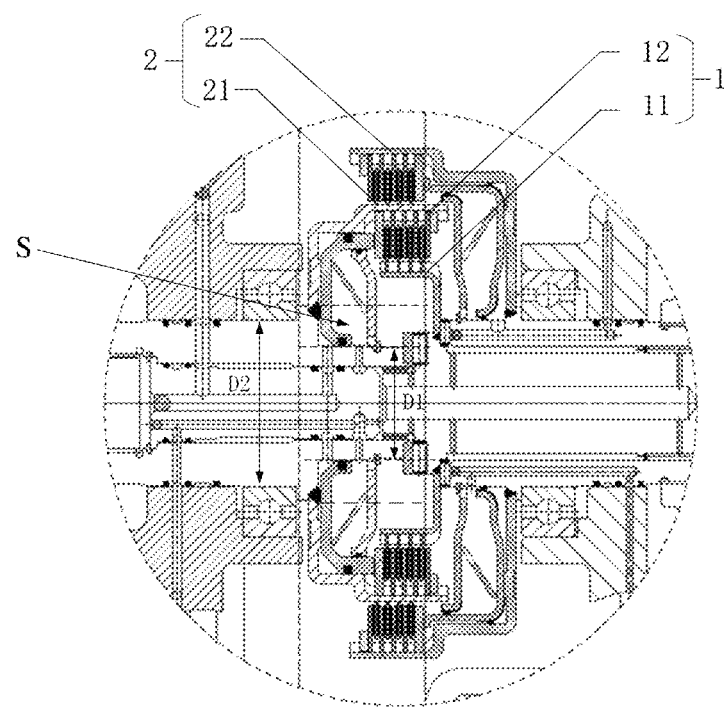
FIG. 2 is an enlarged diagram of a position A in FIG. 1.

As shown in FIG. 1 and FIG. 2, the hybrid power system according to the embodiments of the present disclosure includes a first clutch 1, a second clutch 2, an engine 3 (not shown in the drawings), a first motor 4, a second motor 5, and a power output assembly 6. Two ends of the first clutch 1 are respectively connected to the first motor 4 and the engine 3, two ends of the second clutch 2 are respectively connected to the first clutch 1 and the power output assembly 6, and the second motor 5 is connected to the power output assembly 6. The first clutch 1 and the second clutch 2 are disposed in a radial direction of an output shaft 41 of the first motor 4, and the second clutch 2 is disposed on a side, away from the output shaft 41 of the first motor 4, of the first clutch 1.

It should be noted that in the embodiments of the present disclosure, the first clutch 1 and the second clutch 2 being disposed in the radial direction of the output shaft 41 of the first motor 4 means that an arrangement direction of the first clutch 1 and the second clutch 2 is perpendicular to an axis of the output shaft 41 of the first motor 4. Illustratively, the first clutch 1 and the second clutch 2 are sequentially disposed on a side of the output shaft 41 of the first motor 4, and in this case, the second clutch 2 is disposed on a side, away from the output shaft 41 of the first motor 4, of the first clutch; or, the first clutch 1 and the second clutch 2 are sleeved on the output shaft 41 of the first motor 4, and in this case, the first clutch surrounds a periphery of the output shaft 41 of the first motor 4, and the second clutch surrounds a periphery of the first clutch.

In the embodiments of the present disclosure, as the first clutch 1 and the second clutch 2 are disposed in the radial direction of the output shaft 41 of the first motor 4, the axial arrangement space is saved, and the system structure is more compact. The engine 3 and the first motor 4 are respectively connected to the two ends of the first clutch 1, and power is transmitted through connection and cooperation between the first clutch 1 and the second clutch 2, such that the system integration is high. The engine 3 is decoupled from the wheels through the first clutch 1 and the second clutch 2 to avoid the impact in switching modes. Based on the three power sources, that is, the engine 3, the first motor 4, and the second motor 5 and the two control devices, that is, the first clutch 1 and the second clutch 2, a plurality of operating modes are supported, such that the fuel saving effect is improved. In some embodiments of the present disclosure, as shown in FIG. 2, the first clutch 1 includes a first portion 11 and a second portion 12. The first portion 11 and the second portion 12 are controllably engaged or disengaged. The second clutch 2 includes a third portion 21 and a fourth portion 22. The third portion 21 and the fourth portion 22 are controllably engaged or disengaged. The second portion 12 of the first clutch 1 is connected to the third portion 21 of the second clutch 2. As the second portion is directly connected to the third portion, the integration and structure compactness of the system are further improved.

In some embodiments, the second portion 12 and the third portion 21 are integrally connected. The second portion 12 of the first clutch 1 and the third portion 21 of the second clutch 2 are integrally connected, such that the two clutches are assembled conveniently, and the assembling process and the cost are reduced. In addition, as the two clutches only have three clutch hubs, the structure after assembling the two clutches is more compact and has strong linkage.

In the embodiments of the present disclosure, the integrated structure of the second portion 12 and the third portion 21 is acquired by stamping manufacturing, or by processing using machine tools after manufacturing.

In some embodiments of the present disclosure, as shown in FIG. 1 and FIG. 2, the first portion 11 is sleeved on an output shaft 31 of the engine 3, and one end of the second portion 12 is sleeved on the output shaft 41 of the first motor 4, and the other end of the second portion 12 is disposed on a side, away from the output shaft 31 of the engine 3, of the first portion 11 and is engaged with the first portion 11. The third portion 21 is sleeved on the other end of the second portion 12, and one end of the fourth portion 22 is connected to the power output assembly 6, and the other end of the fourth portion 22 is disposed on a side, away from the second portion 12, of the third portion 21 and is engaged with the third portion 21.

The first portion 11 is fixedly connected to a shaft wall of the output shaft 31 of the engine 3, and thus is rotatable under driving of the output shaft 31 of the engine 3. The second portion 12 is fixedly connected to a shaft wall of the output shaft 41 of the first motor 4, and thus is rotatable under driving of the output shaft 41 of the first motor 4. In the case that the first portion 11 and the second portion 12 are engaged, power output by the engine 3 is transmitted to the first motor 4, power output by the first motor 4 is transmitted to the engine 3, or, power output by the engine 3 and power output by the first motor 4 are transmitted to subsequent devices through the first clutch 1, for example, transmitted to the third portion 21 of the second clutch 2.

Figure 3:
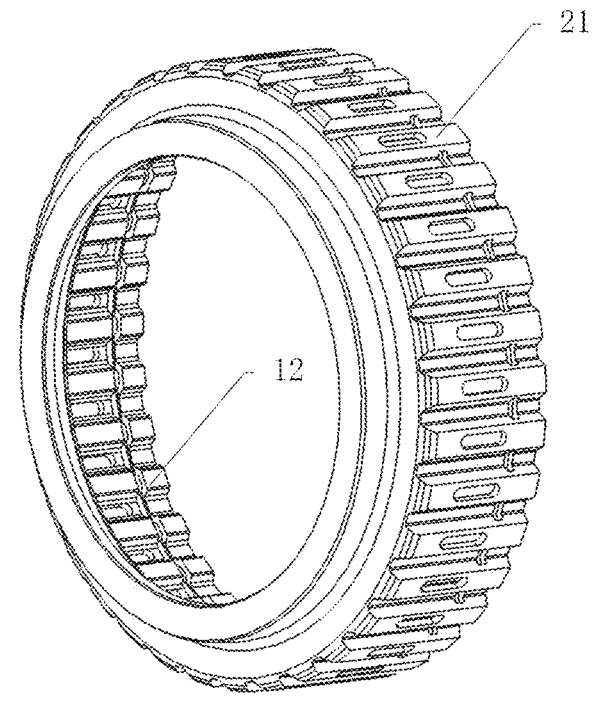
FIG. 3 is a schematic structural diagram of a hub sleeve according to some embodiments of the present disclosure.

The third portion 21 of the second clutch 2 is connected to or disposed on an end, away from the first motor 4, of the second portion 12 to avoid failure caused by stress concentration at the end of the second portion 12 connected to the output shaft 41 of the first motor 4. In some embodiments of the present disclosure, as shown in FIG. 3, the first portion 11 is an inner hub of the first clutch 1, the second portion 12 is an outer hub of the first clutch 1, the third portion 21 is an inner hub of the second clutch 2, the fourth portion 22 is an outer hub of the second clutch 2, and the outer hub of the first clutch 1 and the inner hub of the second clutch 2 are formed by respectively machining splines on an inner wall and an outer wall of a same hub sleeve.

The hub sleeve refers to a cylindrical clutch hub, and is generally sleeved outside the power shaft in the assembling process, for example, sleeved outside the output shaft 41 of the first motor 4 in the embodiments of the present disclosure. The inner wall and the outer wall of the hub sleeve are respectively provided with toothed splines. The spline parameters of the inner wall of the hub sleeve are different from the spline parameters of the outer wall of the hub sleeve. The toothed parameters of the inner hub of the first clutch 1 are matched with the spline parameters of the inner wall of the hub sleeve, and the toothed parameters of the outer hub of the second clutch 2 are matched with the spline parameters of the outer wall of the hub sleeve.

Illustratively, the first clutch 1 and the second clutch 2 are friction clutches. A plurality pf pieces of corresponding clutch plates are respectively disposed in the first portion 11 and the second portion 12 of the first clutch 1, a plurality of pieces of corresponding clutch plates are respectively disposed in the third portion 21 and the fourth portion 22 of the second clutch 2. The two portions of each clutch achieve rotation speed synchronization based on mutual friction between the clutch plates.

In some embodiments of the present disclosure, splines on the inner wall of the same hub sleeve and splines on the outer wall of the same hub sleeve are arranged in an opposing staggered configuration to ensure the strength of the hub sleeve. Illustratively, referring to FIG. 3, a protruded portion of the spline on the inner wall of the hub sleeve corresponds to a recessed portion of the spline on the outer wall of the hub sleeve, and a recessed portion of the spline on the inner wall of the hub sleeve corresponds to a protruded portion of the spline on the outer wall of the hub sleeve.

In some embodiments, the splines on the inner wall of the hub sleeve and the splines on the outer wall of the hub sleeve are trapezoidal splines. The trapezoidal splines are formed by stamping process, which is simple and easy to manufacture.

The first motor 4 may include a stator and a rotor. The stator refers to a fixed portion of the first motor 4, and for example, is provided with a pair of direct current excited stationary main magnetic poles; and the rotor is an iron core running from the inside of the stator, and, for example, is provided with an armature winding, which generates an induced electromotive force when powered up to rotate relative to the stator under the action of excitation. As shown in FIG. 1, part of the rotor protrudes from the inside of the stator to form an output shaft, or part of the rotor protrudes from the inside of the stator and is connected to a connection shaft to form an output shaft; and the hub sleeve is fixedly connected to the output shaft. Illustratively, the fixed connection mode includes screw, welding, and the like. Therefore, in the case that the rotor of the first motor 4 rotates, the hub sleeve synchronously rotates with the rotor. An arrangement space is reserved between the splined portion on the hub sleeve and the output shaft 41 of the first motor 4 to facilitate arrangement of the inner hub of the first clutch 1. That is, the inner hub of the first clutch 1 is disposed in the space.

Referring to FIG. 1, in some embodiments of the present disclosure, the output shaft 41 of the first motor 4 is a step shaft. A diameter D1 of a shaft head of the step shaft is less than a diameter D2 of a shaft body of the step shaft. The shaft head refers to an end portion, away from the stator, of the rotor of the first motor 4. The second portion 12 is connected to the shaft head, such that at least part of the second portion 12 is accommodated in an annular space S surrounding the shaft head. The structure of the step shaft means that a notch is defined in the end portion, away from the stator, of the rotor along the circumference, and part of the first clutch 1 is disposed in the notch. As part of the first clutch 1 is disposed in the annular space S, the radial space is saved, such that the arrangement of the first clutch 1 and the output shaft 41 of the first motor 4 is more compact. The term "radial" herein refers to a radial direction of the output shaft 41 of the first motor 4.

In some embodiments of the present disclosure, the power output assembly 6 includes a hollow shaft 61. The hollow shaft 61 is sleeved on an output shaft 31 of the engine 3 and is rotatable relative to the output shaft 31 of the engine 3. A length of the hollow shaft 61 is less than a length of the output shaft 31 of the engine 3, such that an end of the output shaft 31 of the engine 3 protrudes from the hollow shaft 61 and is connected to the first portion 11. The fourth portion 22 is connected to the hollow shaft 61.

The hollow shaft 61 is rotatable freely relative to the output shaft 31 of the engine 3. Illustratively, a bearing is disposed between the hollow shaft 61 and the output shaft 31 of the engine 3, and the hollow shaft 61 and the output shaft 31 of the engine 3 are connected through the bearing to rotate relative to each other.

Part of the output shaft 31 of the engine 3 protrudes from a cylinder cover of the engine 3. In some embodiments, the output shaft 31 of the engine 3 is a crankshaft, or the output shaft 31 of the engine 3 includes a crankshaft and a connection shaft connected to the crankshaft. The hollow shaft 61 is sleeved on a portion of the output shaft that protrudes from the cylinder cover of the engine 3, and the length of hollow shaft 61 is less than a length of the protruded portion, such that the end portion of the output shaft 31 of the engine 3 protrudes from the hollow shaft 61.

In some embodiments, the end portion of the output shaft 31 of the engine 3 that protrudes from the hollow shaft 61 is fixedly connected to the first portion 11 of the first motor 4. Illustratively, the fixed connection mode includes screw, welding, and the like. Therefore, in the case that the output shaft 31 of the engine 3 rotates, the first portion 11 synchronously rotates with the output shaft 31.

In the embodiments of the present disclosure, the power output assembly 6 further includes a first gear 62 affixed on the hollow shaft 61, an intermediate shaft 63, and a second gear 64 and a third gear 65 affixed on the intermediate shaft 63. The first gear 62 synchronously rotates with the hollow shaft 61, the second gear 64 synchronously rotates with the intermediate shaft 63, and the first gear 62 is engaged with the second gear 64. In the case that the hollow shaft 61 rotates, the power is sequentially transmitted through the hollow shaft 61, the first gear 62, the second gear 64, and the intermediate shaft 63, and the intermediate shaft 63 continues to output the power backward.

The fourth portion 22 of the second clutch 2 is fixedly connected to the hollow shaft 61. Thus, in the case that the hollow shaft 61 rotates, the fourth portion 22 synchronously rotates. In the case that the second clutch 2 is in an engaged state, the power at the hub sleeve is transmitted through the second clutch 2 to a power output assembly 6 direction, or is transmitted through the power output assembly 6 and the second clutch 2 to a hub sleeve direction. Illustratively, the fixed connection mode between the fourth portion 22 and the hollow shaft 61 includes screw, welding, and the like.

In some embodiments, the second gear 64 is further engaged with a motor output gear 52 on the output shaft 51 of the second motor 5, and thus the power output by the second motor 5 is transmitted through the motor output gear 52, the second gear 64, and the intermediate shaft 63 in sequence to achieve power transmission.

In some embodiments of the present disclosure, an output shaft 41 of the first motor 4 and an output shaft 31 of the engine 3 are coaxial and close to each other, and a gap is present between the output shaft 41 of the first motor 4 and the output shaft 31 of the engine 3. The gap is inside the first clutch 1 and the second clutch 2.

The output shaft 41 of the first motor 4 and the output shaft 31 of the engine 3 are coaxial and close to each other, such that a power transmission path between the two power sources is short, and the power loss is less.

In some embodiments of the present disclosure, the first motor 4 acts as a starter for the engine 3. The starting of the engine 3 needs external support. In general, a starter is configured for the engine 3, and a flywheel of the engine 3 is driven, by the starter, to rotate, such that the engine 3 is started. However, in the embodiments of the present disclosure, the engine 3 is driven, by the first motor 4, to start, and thus the first motor 4 acts as the starter. Thus, no starter is disposed in the hybrid power system, and the structure is simplified.

Specifically, before start of the engine 3, the first clutch 1 is controlled to be engaged, the second clutch 2 is controlled to be disengaged, and the first motor is controlled to operate. In this case, the power output by the first motor 4 is transmitted to the output shaft 31 of the engine 3 after traveling through the output shaft 41 of the first motor 4, the second portion 12 of the first clutch 1, and the first portion 11 of the first clutch 1 to drive the engine 3 to start.

Similarly, the first motor 4 assists in stopping the engine 3 and adjusting the speed of the engine 3. In the case that the first motor 4 assists in starting and accelerating the engine 3, the first motor 4 converts electric energy into mechanical energy to output the power. In the case that the first motor 4 assists in stopping or decelerating the engine 3, the first motor 4 converts the mechanical energy output by the engine 3 into electric energy and store the electric energy for use.

In some embodiments of the present disclosure, the first motor 4 is not configured to assist in starting the engine 3, and a separate starter is disposed for the engine 3.

It should be noted that a gap is present between an end portion of the output shaft 41 of the first motor 4 close to the output shaft 31 of the engine 3 and an end portion of the output shaft 31 of the engine 3 close to the output shaft 41 of the first motor 4, that is, the end portions are not in contact with each other. The gap is a minimum distance between the engine 3 and the first motor 4, which is not too large, otherwise an axial layout space is wasted. The term "axial" herein refers to an axis direction of the output axis 41 of the first motor 4. In general, a maximum of the gap is not greater than a size of the first clutch 1 and a size of the second clutch 2. That is, the gap is in the first clutch 1 and the second clutch 2. The smaller the gap, the more compact the arrangement of the system. However, in the case that the engine 3 and the first motor 4 rotate, the output shaft jitters, and thus the gap should not be too small to ensure that the engine 3 and the first motor 4 are not affected by each other whether in separate rotation or in simultaneous rotation.

In some embodiments of the present disclosure, an axis of the output shaft 51 of the second motor 5 is parallel to an axis of the output shaft 41 of the first motor 4, and a length of the output shaft 51 of the second motor 5 is greater than a length of the output shaft 41 of the first motor 4.

An arrangement direction of the second motor 5 is the same as that of the first motor 4 and the engine 3. Thus, the axis of the output shaft 51 of the second motor 5 is parallel to the axis of the output shaft 41 of the first motor 4 and the axis of the output shaft 31 of the engine 3 to ensure the full and reasonable utilization of the layout space. In addition, as the output shafts of the three power sources are parallel to each other, the direction change in the transmission of power is reduced, such that the power loss is reduced, and the power transmission efficiency is improved.

The second motor 5 may also include a stator and a rotor. As shown in FIG. 1, part of the rotor protrudes from the inside of the stator to form an output shaft, or part of the rotor protrudes from the inside of the stator and is connected to a connection shaft to form the output shaft 51 of the second motor 5. The length of the output shaft 51 of the second motor 5 is greater than the length of the output shaft 41 of the first motor 4, such that the output shaft 51 of the second motor 5 includes a corresponding portion of the output shaft 41 of the first motor 4 and a corresponding portion of the output shaft 31 of the engine 3, such that the path for power transmission is shortened, a number of other power transmission assemblies, such as the gear and the intermediate shaft 63, is reduced, and the loss in the power transmission process is reduced.

In some embodiments of the present disclosure, as shown in FIG. 1, an overlapped region is present between an orthographic projection of the power output assembly 6 on a first plane P1, an orthographic projection of the output shaft 31 of the engine 3 on the first plane P1, and an orthographic projection of the output shaft 51 of the second motor 5 on the first plane P1, and a space G is present between the orthographic projection of the power output assembly 6 on the first plane P1 and an orthographic projection of the output shaft 41 of the first motor 4 on the first plane P1. The first plane P1 is a plane that runs through the axis of the output shaft 41 of the first motor 4 and is perpendicular to a vertical line between the axis of the output shaft 51 of the second motor 5 and an axis of the output shaft 31 of the engine 3. The first plane P1 is also referred to as an overlapping plane.

In conjunction with FIG. 1, it can be seen that the power output assembly 6 is actually disposed between the output shaft 31 of the engine 3 and the output shaft 51 of the second motor 5. Specifically, the power output assembly 6 is disposed between the output shaft 31 of the engine 3 and a portion, corresponding to the output shaft 31 of the engine 3, of the output shaft 51 of the second motor 5. Therefore, the overlapped region is present between the orthographic projection of the power output assembly 6 on the first plane, the orthographic projection of the output shaft 31 of the engine 3 on the first plane, and the orthographic projection of the output shaft 51 of the second motor 5 on the first plane, and the orthographic projection of the power output assembly 6 on the first plane, the orthographic projection of the output shaft 31 of the engine 3 on the first plane, and the orthographic projection of the output shaft 51 of the second motor 5 on the first plane are not overlapped with the orthographic projection of the output shaft 41 of the first motor 4 on the first plane. Therefore, the use of the layout space in the system is more reasonable and balanced, most of the assemblies are not disposed in a region to cause distribution imbalance, and thus the space is not wasted.

Illustratively, the first plane is a plane that runs through the axis of the output shaft 41 of the first motor 4 and is perpendicular to a section shown in FIG. 1.

In some embodiments of the present disclosure, the system further includes a housing 8. The first motor 4, the second motor 5, the first clutch 1, and the second clutch 2 are all disposed inside the housing 8, and an arrangement direction of the first motor 4 and the second motor 5 inside the housing 8 is perpendicular to an axis of the output shaft 41 of the first motor 4. The engine 3 is disposed outside the housing 8, and an output shaft 31 of the engine 3 includes a power output of the engine 3 and a connection shaft 311 detachably connected to the power output of the engine 3. The connection shaft 311 is disposed inside the housing 8 and is rotatable relative to the housing 8, and part of the connection shaft 311 protrudes from the housing 8.

For three power resources, a volume of the first motor 4 and a volume of the second motor 5 are small, and a volume of the engine 3 is large. The first motor 4, the second motor 5, the first clutch 1, the second clutch 2, the power output assembly 6, and the connection shaft 311 are disposed inside the housing 8 to facilitate assembling, and the engine 3 is independent of the housing 8. The engine 3 has a power output, and the power output is, for example, a crankshaft. The crankshaft is connected to the connection shaft 311 to form the output shaft 31 of the engine 3. In the assembling process, the housing 8 integrated with the first motor 4, the second motor 5, the first clutch 1, the second clutch 2, and the connection shaft 311 and other assemblies and the engine 3 are placed in the corresponding positions respectively, and then the portion of the connection shaft 311 protruding from the housing 8 is connected to the engine 3. The connection mode may be, for example, screw connection, clamp connection, and the like.

In some embodiments of the present disclosure, the hybrid power system further includes a wheel drive assembly 7. The wheel drive assembly 7 includes a differential 71, a wheel drive shaft, and two wheels. The differential 71 is disposed on the wheel drive shaft, and the gears of the differential 71 are engaged with the third gear 65 on the intermediate shaft 63 of the power output assembly 6 to receive power output by the power output assembly 6. The two wheels are disposed on two ends of the wheel drive shaft, and the differential 71 enables the two wheels to rotate at different speeds for fine steering. The power output by the power output assembly 6 is transmitted to the two wheels through the third gear 65, the differential 71, and the wheel drive shaft in sequence.

In the embodiments of the present disclosure, the hybrid power system further includes a power assembly. The first motor 4 and the second motor 5 exchange energy with the power supply assembly. In the case that the first motor 4 and/or the second motor 5 operate, the power supply assembly provides energy to the operating motor; and in the case that the first motor 4 and/or the second motor 5 are in a power generation mode, the power supply assembly receives and stores energy converted by the motor which is generating the power.

The motor being "operating" means that the motor is in a state of converting electric energy into mechanical energy, the motor being "not operating" means that the motor is in a state of neither converting electric energy into mechanical energy nor converting mechanical energy into electric energy, and the motor being "in the power generation mode" means that the motor is in a state of converting mechanical energy into electric energy. The first motor 4 and the second motor 5 can rotate forwards or reversely. The vehicle forwards in the case that the vehicle rotates forwards, and the reversing function of the vehicle is started in the case that the vehicle rotates reversely.

In the embodiments of the present disclosure, the power assembly further includes a power set, a first motor 4 microcontroller unit (MCU1), and a second motor 5 microcontroller unit, a first inverter, and a second inverter. The power set is connected to the first inverter and the second inverter, the first motor 4 microcontroller unit and the first motor 4 are electrically connected to the first inverter, and the second motor 5 microcontroller unit and the second motor 5 are electrically connected to the second inverter.

In some embodiments of the present disclosure, the power supply assembly includes a battery management system capable of monitoring the usage status of the battery set at all times, alleviating inconsistencies of the battery set through necessary measures, and providing security for the use of the battery set.

In summary, the hybrid power system according to the embodiments of the present disclosure is equipped with three power sources: the engine 3, the first motor 4, and the second motor 5. The three power sources are driven separately or jointly, and are combined with the first clutch 1, the second clutch 2, and the two different power transmission paths corresponding to the power output component 6 to output power in a plurality of operating modes and a plurality of levels to drive the wheels to rotate, such that the fuel saving effect is improved. As the first clutch 1 and the second clutch 2 in the embodiments of the present disclosure are an integrated structure connected to each other, based on an arrangement and assembly mode determined based on the structural features of various assemblies, the whole system has the high integration, the compact structure, and the balanced and reasonable space utilization. In addition, as the engine 3 can be decoupled from the wheel through the first clutch 1 and the second clutch 2, the impact in switching modes is avoided, and the driving comfort is improved.

Some embodiments of the present disclosure further provide a hybrid power system. The hybrid power system includes a first clutch 1, a second clutch 2, an engine 3, a first motor 4, a second motor 5, and a power output assembly 6. The first clutch 1 and the second clutch 2 are disposed in a radial direction of an output shaft of the first motor 4. The first clutch 1 includes a first portion 11 and a second portion 12 that are controllably engaged or disengaged. The first portion 11 is connected to an output shaft of the engine 3, and the second portion 12 is connected to the output shaft of the first motor 4. The second clutch 2 includes a third portion 21 and a fourth portion 22 that are controllably engaged or disengaged. The third portion 21 is connected to the second portion 12 and is disposed on a side, away from the first motor 4, of the second portion 12, and the fourth portion 22 is connected to the power output assembly 6. An output shaft of the second motor 5 is connected to the power output assembly 6.

In some embodiments of the present disclosure, the second portion 12 and the third portion 21 are integrally connected.

In some embodiments of the present disclosure, the first portion 11 is an inner hub of the first clutch 1, the second portion 12 is an outer hub of the first clutch 1, the third portion 21 is an inner hub of the second clutch 2, the fourth portion 22 is an outer hub of the second clutch 2, and the outer hub of the first clutch 1 and the inner hub of the second clutch 2 are formed by respectively machining splines on an inner wall and an outer wall of a same hub sleeve.

In some embodiments of the present disclosure, the hub sleeve is sleeved on the outside of the output shaft of the first motor 4, and is fixedly connected to the output shaft of the first motor 4, such that the hub sleeve rotates under driving of the first motor 4.

In some embodiments of the present disclosure, the power output assembly 6 includes a hollow shaft 61. The hollow shaft 61 is sleeved on a periphery of an output shaft of the engine 3 and is rotatable relative to the output shaft of the engine 3. A length of the hollow shaft 61 is less than a length of the output shaft of the engine 3, such that an end of the output shaft 31 of the engine 3 protrudes from the hollow shaft 61 and is connected to the first portion 11. The fourth portion 22 is connected to the hollow shaft 61.

In some embodiments of the present disclosure, an output shaft of the first motor 4 and an output shaft of the engine 3 are coaxial and close to each other, and a gap is present between the output shaft of the first motor 4 and the output shaft of the engine 3. The gap is inside the first clutch 1 and the second clutch 2.

In some embodiments of the present disclosure, an axis of the output shaft of the second motor 5 is parallel to an axis of the output shaft of the first motor 4, and a length of the output shaft of the second motor 5 is greater than a length of the output shaft of the first motor 4.

In some embodiments of the present disclosure, an overlapped region is present between an orthographic projection of the power output assembly 6 on a first plane, an orthographic projection of the output shaft of the engine 3 on the first plane, and an orthographic projection of the output shaft of the second motor 5 on the first plane, and a space is present between the orthographic projection of the power output assembly 6 on the first plane and an orthographic projection of the output shaft of the first motor 4 on the first plane. The first plane runs through the axis of the output shaft of the first motor 4 and is perpendicular to a vertical line between the axis of the output shaft of the second motor 5 and an axis of the output shaft of the engine 3.

In some embodiments of the present disclosure, the system further includes a housing 8. The first motor 4, the second motor 5, the first clutch 1, and the second clutch 2 are all disposed inside the housing 8, and an arrangement direction of the first motor 4 and the second motor 5 inside the housing 8 is perpendicular to an axis of the output shaft of the first motor 4. The engine 3 is disposed outside the housing 8, and an output shaft of the engine 3 includes a power output of the engine 3 and a connection shaft 311 detachably connected to the power output of the engine 3. Part of the connection shaft 311 protrudes from the housing 8.

In the hybrid power system according to the embodiments of the present disclosure, as the first clutch 1 and the second clutch 2 are disposed in the radial direction of the output shaft 41 of the first motor 4, the axial arrangement space is saved, and the system structure is more compact. The engine 3 and the first motor 4 are respectively connected to the first portion 11 and the second portion 12 of the first clutch 1, and power is transmitted through connection and cooperation between the first clutch 1 and the second clutch 2, such that the system integration is high. The engine 3 is decoupled from the wheels through the first clutch 1 and the second clutch 2 to avoid the impact in switching modes. Based on the three power sources of the engine 3, the first motor 4, and the second motor 5 and the two control devices of the first clutch 1 and the second clutch 2, a plurality of operating modes are acquired to improve the fuel saving effect.

Some embodiments of the present disclosure further provide a hybrid electric vehicle. The hybrid electric vehicle includes the hybrid power system according to any of the above embodiments. The vehicle further includes a controller that can determine a matching operating mode based on the current vehicle state and control the hybrid power system to switch to the corresponding operating mode. The current vehicle state includes at least current accelerator pedal opening, current brake pedal opening, a current power battery amount, a current speed, and a current operating situation. The operating modes that can be realized by the hybrid power system at least include a first pure electric driving mode, a second pure electric driving mode, a first hybrid driving mode, a second hybrid driving mode, an engine direct driving mode, an energy recovery mode, and a stationary power generation mode.

Operating situations applicable to some operating modes corresponding to the hybrid power system according to the embodiments of the present disclosure and power transmission paths of the hybrid electric vehicle in various operating modes are described in detail hereinafter in combination with FIG. 2 to FIG. 7.

(1) The First Pure Electric Driving Mode

In the case that the vehicle according to the embodiments of the present disclosure is in the pure electric driving mode, the second motor 5 acts as a separate power source. The operating mode is generally applicable to the situation where the vehicle is in low-speed creep or in a cruising state, for example, an urban situation, such that the power consumption in the process of congestion and parking and waiting is reduced, and more power is saved. Thus, requirements of economy, power, comfort and the like of the user are met.

In this case, the controller is configured to: control the second motor 5 to operate, control the engine 3 and the first motor 4 not to operate, and control the first clutch 1 and the second clutch 2 to be disengaged.

Figure 4:
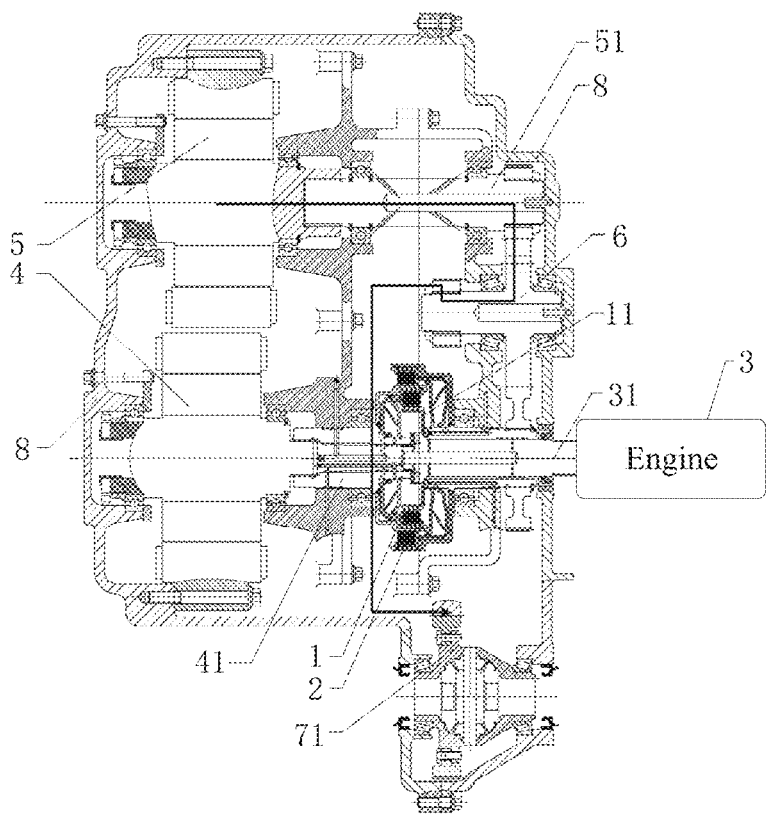
FIG. 4 is a schematic diagram of power transmission in a first pure electric driving mode.

As shown in FIG. 4, in the case that the second motor 5 separately drives the vehicle, the direct current output by the power battery is converted into the three-phase alternating current through the second inverter to drive the output shaft 51 of the second motor 5 to rotate, and the power output by the second motor 5 is directly transmitted to the power output assembly 6. Then, the first transmission path of power between the power output assembly 6 and the wheel drive assembly 7 is that the second gear 64 rotates after receiving the power transmitted by the motor output gear 52 on the output shaft 51 of the second motor 5 and drives the intermediate shaft 63 and the third gear 65 to rotate, and the power is then transmitted to the drive shaft after traveling through the gear of the differential 71 engaged with the third gear 65 and transmitted to the wheel to drive the vehicle.

The second motor 5 forwards in the case that the vehicle rotates forwards, and the reversing function of the vehicle is started in the case that the vehicle rotates reversely.

Based on the energy consumption, the first motor 4 is not separately used to drive the vehicle generally. However, in some cases, for example, the failure of the second motor 5, the first motor 4 is separately used to drive the vehicle. In the case that the first motor 4 drives the vehicle separately, the controller is configured to: control the first motor 4 to operate, control the engine 3 and the second motor 5 not to operate, control the first clutch 1 to be disengaged, and control the second clutch 2 to be engaged.

In the case that the first motor 4 drives the vehicle separately, the transmission path is that the direct current output by the power battery is converted into the three-phase alternating current through the first inverter to drive the output shaft 41 of the first motor 4 to rotate, and the power output by the first motor 4 is transmitted to the power output assembly 6 after traveling through the engaged second clutch 2. Then, the second transmission path of power between the power output assembly 6 and the wheel drive assembly 7 is that the hollow shaft 61 rotates after receiving the power transmitted by the second clutch 2 and drives the first gear 62 affixed on the hollow shaft 61 to rotate, and the power is transmitted to the intermediate shaft 63 after traveling through the second gear 64 engaged with the first gear 62 to cause the intermediate shaft 63 and the third gear

65 to synchronously rotate, transmitted to the drive shaft after traveling through the gear of the differential 71 engaged with the third gear 65, and then transmitted to the wheel to drive the vehicle.

It should be noted that in the single-motor driving mode, compared with driving by the second motor 5, driving by the first motor 4 needs a longer power transmission path, such that the power loss is greater. Therefore, in the case that the second motor 5 operates normally, the first motor 4 is generally not used as a single power source to drive.

(2) The Second Pure Electric Driving Mode

In the case that the vehicle according to the embodiments of the present disclosure is in the pure electric driving mode, the first motor 4 and the second motor 5 act as a joint power source to drive the vehicle. The dual-motor driving is generally applicable to a scenario where the user needs to keep the vehicle at a low speed state and temporarily needs a large torque, for example an overtaking scenario, a starting scenario, and the like, such that the vehicle acquires a large torque in a short time and has a good dynamic response.

In the dual-motor driving, the controller is configured to: control the first motor 4 and the second motor 5 to operate, control the engine 3 not to operate, control the first clutch 1 to be disengaged, and control the second clutch 2 to be engaged.

Figure 5:
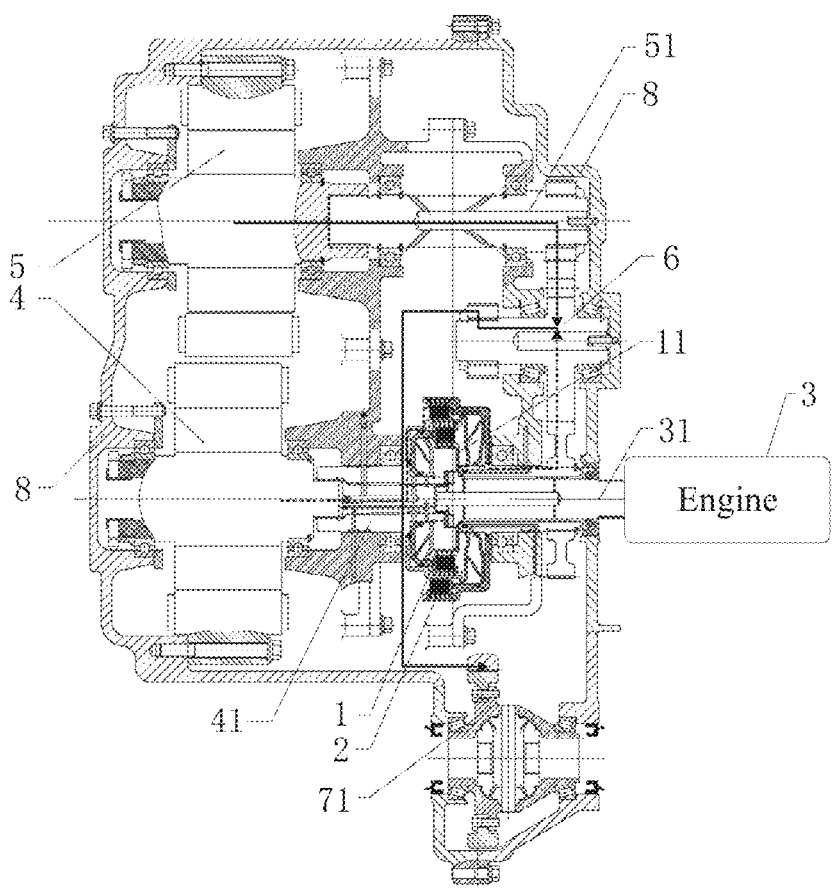
FIG. 5 is a schematic diagram of power transmission in a second pure electric driving mode.

As shown in FIG. 5, in the case that the first motor 4 and the second motor 5 jointly drive the vehicle, the direct current output by the power battery is converted into the three-phase alternating current through the first inverter and the second inverter to drive the first motor 4 and the output shaft 51 of the second motor 5 to rotate. The power output by the first motor 4 is transmitted to the power output assembly 6 after traveling through the second clutch 2, the power output by the second motor 5 is directly transmitted to the power output assembly 6, and the power is converged at the second gear 64 in the power output assembly 6 and transmitted to the wheel drive assembly 7. The power transmission paths of power output by the first motor 4 and the second motor 5 are described in the above embodiments, which are not repeated herein.

(3) The First Hybrid Driving Mode

The first hybrid driving mode in the embodiments of the present disclosure is also referred to as a serial/range extended hybrid driving mode. In the case that the vehicle is in the first hybrid driving mode, the engine 3 and the second motor 5 act as a mixed power source. The first motor 4 acts as a power generation device, and the operating mode is generally applicable to a high torque situation and a rapid acceleration situation, for example, a scenario where the vehicle is at a high speed state and temporarily needs a large torque to overtake, such that the power advantage of the engine 3 at the high speed and the fast response of the motor are used. Thus, the vehicle can obtain a large torque in a short time when driving at the high speed. The operating mode is also applicable to a scenario where the electricity amount of the power battery is insufficient, the first motor 4 generates power to supply the power for the second motor 5 to drive the vehicle.

In the embodiments of the present disclosure, in the case that the vehicle is in the first hybrid driving mode, the controller is configured to: control the engine 3 and the second motor 5 to operate, control the first motor 4 to be in a power generation mode, control the first clutch 1 to be engaged, and control the second clutch 2 to be disengaged.

Figure 6:
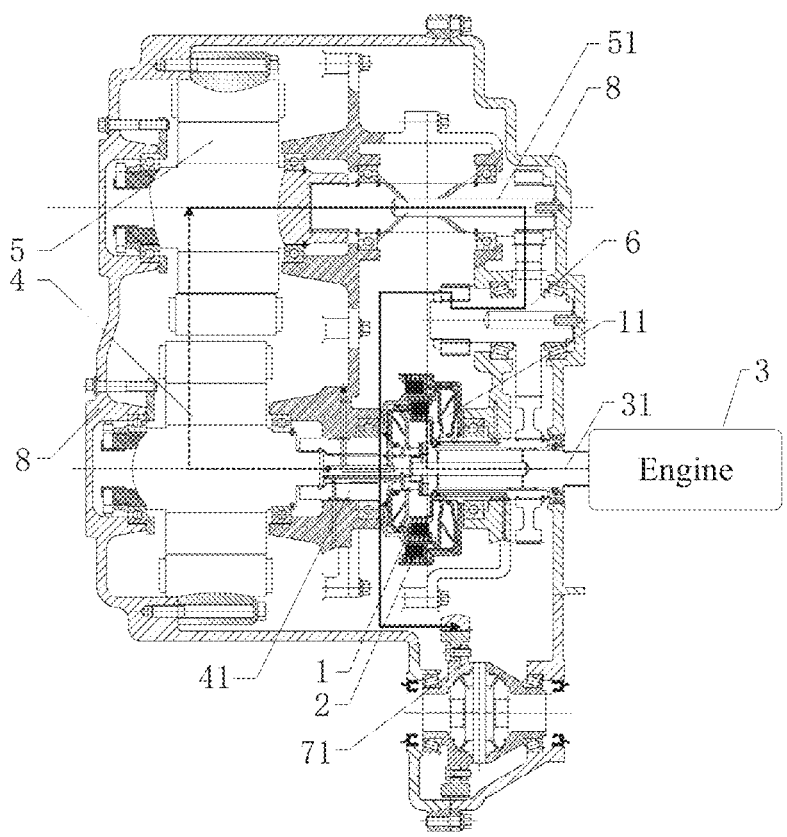
FIG. 6 is a schematic diagram of power transmission in a first hybrid driving mode.

FIG. 6 shows a power transmission path in the case that the vehicle drives the vehicle in a first hybrid driving mode. The engine 3 operates in an efficient zone to drive the first motor 4 to generate power, and the generated electric energy is converted by the first inverter and the second inverter and transmitted to the second motor 5 for the second motor 5 to drive the vehicle. Simultaneously, in conjunction with the use situation of the electric energy of the second motor 5, the excess electric energy is stored in the power battery in response the excess electric energy. In the case that the electric energy generated by the first motor 4 is insufficient, the power battery replenishes the electricity amount, such that the first motor 4 and the power battery jointly meet the electricity demand of the second motor 5.

In the case that the engine 3 outputs the power, the power transmission path is that the power output by the output shaft 31 of the engine 3 is transmitted to the first motor 4 after traveling through the engaged first cultch 1. The power transmission path of power output by the second motor 5 to the wheel end is described in the above embodiments, which is not repeated herein.

In the above first hybrid driving mode, the engine 3 is decoupled to the differential 71 and the wheel, and only drives the first motor 4 to rotate. Thus, the wheel end is not affected in switching modes, and the driving comfort is improved. In addition, the engine 3 has a great fuel saving effect and a high economy.

(4) The Second Hybrid Driving Mode

The second hybrid driving mode in the embodiments of the present disclosure is also referred to as a parallel hybrid driving mode. In the case that the vehicle is in the second hybrid driving mode, the engine 3 and at least one motor act as power sources. That is, at least two power sources operate jointly to drive the vehicle. In the operating mode, the variable transmission system outputs a large power to improve the power performance of the vehicle, which is generally applicable to a large torque situation, a rapid acceleration situation, and a situation of the insufficient electricity amount of the power battery.

In the embodiments of the present disclosure, in the case that the vehicle is controlled to be in the parallel hybrid driving mode, the power sources include the following two cases based on a number of power sources.

In a first case, the engine 3 and the second motor 5 act as a joint power source. In this case, the controller is configured to: control the engine 3 to operate, control the first motor 4 not to operate or in a power generation mode, control the second motor 5 to operate, and control the first clutch 1 and the second clutch 2 to be engaged.

In the first case, the engine 3 operates in an efficient zone to output power. In the case that the first motor 4 is in the power generation mode, part of power output by the engine 3 is configured to drive the first motor to generate electricity, and the generated electricity is transmitted to the second motor 5 after being converted by the first inverter and the second inverter for the second motor 5 to drive the vehicle. Part of power is directly used to drive the vehicle. In the case that the first motor 4 does not operate, part of the power output by the engine 3 drags the output shaft 41 of the first motor 4 to rotate and thus is lost, and part of the power is used to directly drive the vehicle.

In conjunction with the use situation of the electric energy of the second motor 5, the excess electric energy is stored in the power battery in response the excess electric energy. In the case that the electric energy generated by the first motor 4 is insufficient, the power battery replenishes the electricity amount, such that the first motor 4 and the power battery jointly meet the electricity demand of the second motor 5.

In the case that the engine 3 directly drives the vehicle, the power transmission path is that the power is transmitted by the output shaft 31 of the engine 3 to the connected first cultch 1, is transmitted to the second clutch 2 after traveling through the engaged first cultch 1, and is transmitted to the power output assembly 6 and the wheel drive assembly 7 after traveling through the second clutch 2. Part of the power output by the engine 3 for driving the vehicle is converged at the second gear 64 with the power output by the second motor 5, which are transmitted backwards. The power transmission path of the power between the power output assembly 6 and the vehicle drive assembly are described in the above embodiments, which are not repeated herein.

In a second case, the engine 3, the first motor 4, and the second motor 5 act as a joint power source. In this case, the controller is configured to: control the engine 3, the first motor 4, and the second motor 5 to operate, and control the first clutch 1 and the second clutch 2 to be engaged.

Figure 7:
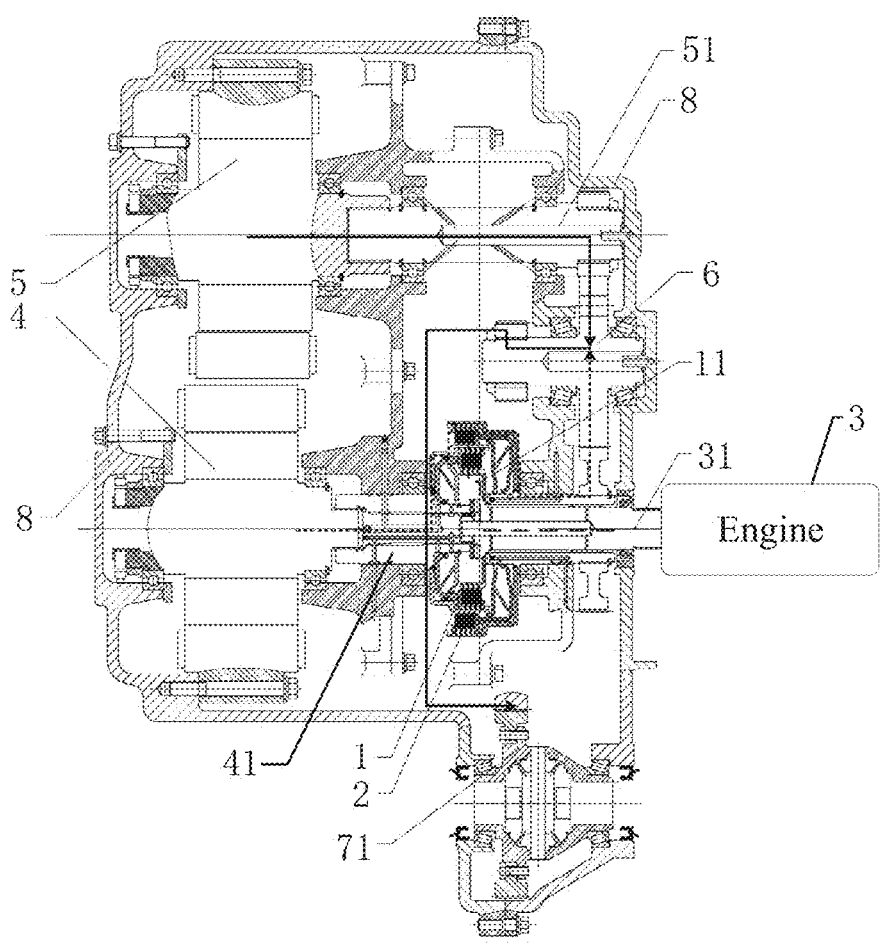
FIG. 7 is a schematic diagram of power transmission in joint driving of three power sources in a second hybrid driving mode.

FIG. 7 shows a power transmission path in the case that the vehicle jointly drives the vehicle using three power sources. The engine 3 operates in an efficient zone to output power, the power battery outputs the direct current, and the direct current is converted into the three-phase alternating current through the first inverter and the second inverter to drive the first motor and the output shaft 51 of the second motor 5 to rotate.

For the case that the engine 3, the first motor 4, and the second motor separately drive the vehicle, the power transmission paths are described in the above embodiments, which are not repeated herein. Part of the power output by the engine 3 for driving the vehicle is converged with the power output by the first motor 4 at the first clutch 1 (in fact, the second portion 12 of the first clutch 1), and then the converged power and the power output by the second motor 5 are further converged at the power output assembly 6 to be transmitted backwards. The power transmission path of the power between the power output assembly 6 and the vehicle drive assembly are described in the above embodiments, which are not repeated herein.

(5) The Engine Direct Driving Mode

In the case that the vehicle according to the embodiments of the present disclosure is in the engine direct driving mode, the engine 3 acts as a separate power source. The operating mode is generally applicable to a scenario where the variable transmission system occurs high voltage failure, a situation of the insufficient electricity amount of the battery, and a high speed situation. In this case, the power consumption is great in driving by the motor, and the power consumption is reduced in the case that the engine 3 is directly used to drive.

In the embodiments of the present disclosure, in the case that the vehicle is controlled to be in the engine direct driving mode, the controller is configured to: control the engine 3 to operate, control the first motor 4 to selectively be in a power generation mode according to the demand of the electricity amount, control the second motor 5 not to operate, and control the first clutch 1 and the second clutch 2 to be engaged.

Figure 8:
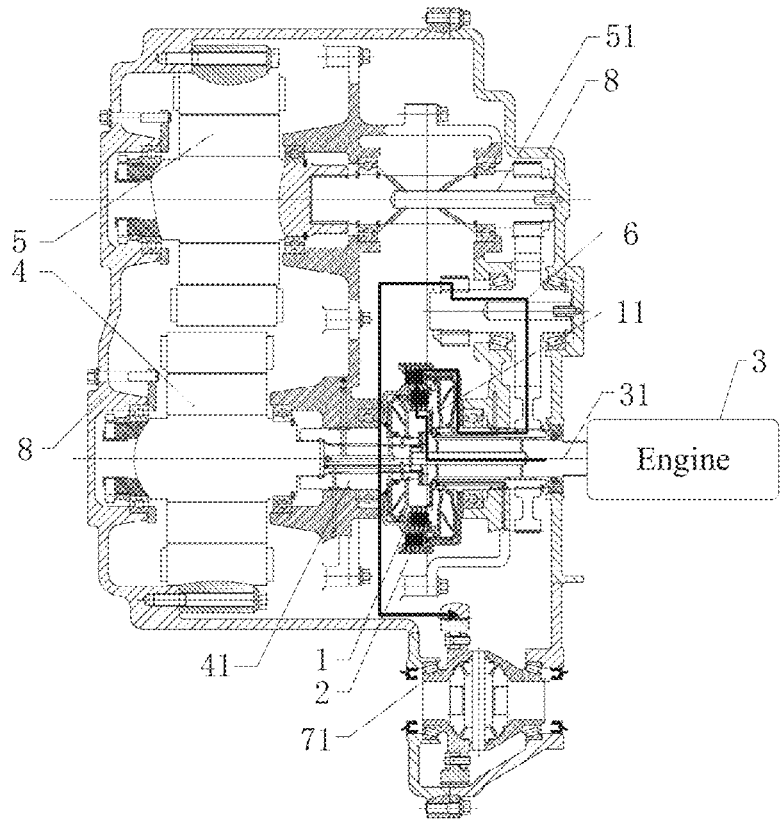
FIG. 8 is a schematic diagram of power transmission in an engine direct driving mode.

FIG. 8 shows a power transmission path in the case that the vehicle drives the vehicle in an engine direct driving mode. The transmission path of the power output by the engine 3 is the same as the transmission path of the power in driving by the engine 3 in the second hybrid driving mode, which are described in the above embodiments and thus are not repeated herein.

In some embodiments, in the case that the power battery does not need charge, the first motor 4 is controlled not to operate. In this case, part of the power output by the engine 3 drags the output shaft 41 of the first motor 4 to rotate and thus is lost, and part of the power is used to directly drive the vehicle.

(6) The Energy Recovery Mode

In the case that the variable transmission system according to the embodiments of the present disclosure is in a taxiing/braking energy recovery mode, at least one of the first motor 4 and the second motor 5 acts as a power generation device to convert the kinetic energy of the vehicle into the electric energy and store the electric energy in the power battery for backup. The operating mode is generally applicable to a taxiing situation and a braking situation, and the vehicle recovers part of the kinetic energy and convert the kinetic energy into the electric energy for storage to provide energy for the subsequent operation of the vehicle, such that the available range of the vehicle is improved.

In a first case, in the case that no power is output by the engine 3, only the second motor 5 acts as the power generation device, and the controller is configured to: control the second motor 5 to be in a power generation mode, control the engine 3 and the first motor 4 not to operate, and control the first clutch 1 and the second clutch 2 to be disengaged.

Figure 9:
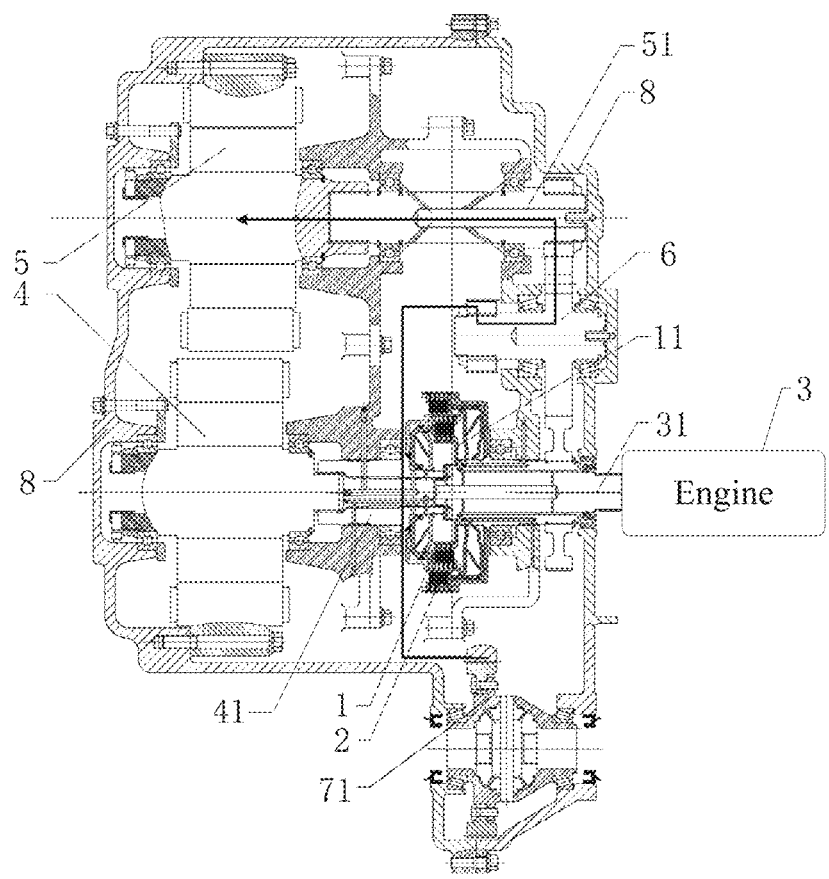
FIG. 9 is a schematic diagram of power transmission in an energy recovery mode where in the case of an engine without power output.

As shown in FIG. 9, in the case that the vehicle starts the energy recovery mode in the taxiing situation and the braking situation, the reverse torque output by the wheel is transmitted to the second motor 5 after traveling through the drive shaft, the gear of the differential 71, the third gear 65, the intermediate shaft 63, the second gear 64, the motor output gear 52, and the output shaft 51 of the second motor 5 in sequence, and the second motor 5 converts the part of braked kinetic energy into the electric energy and stores the electric energy in the power battery for backup. The power transmission path in this mode is exactly opposite to the power transmission path in driving the vehicle by the second motor 5 in the first pure electric driving mode.

In a second case, in the case that the engine outputs the power, the first motor and the second motor jointly act as the power generation device. In this case, the controller is configured to: control the engine 3 to operate, control the first motor 4 and the second motor 5 to be in a power generation mode, control the first clutch 1 to be engaged, and control the second clutch 2 to be disengaged.

In this case, the reverse torque output by the wheel is transmitted to the second motor 5 over the same power transmission path as shown in FIG. 9, and the second motor 5 converts the part of braked kinetic energy into the electric energy and stores the electric energy in the power battery for backup. In addition, the power output by the engine 3 is transmitted to the first motor 4 after traveling through the engaged first clutch 1, and the first motor 4 converts the part of the mechanical energy into the electric energy and stores the electric energy in the power battery for backup.

(7) The Stationary Power Generation Mode

The stationary power generation mode is generally applicable to a situation of the insufficient electricity amount of the battery, and the power battery is charged by the power output by the engine 3. In the embodiments of the present disclosure, in the case that the vehicle is controlled to be in the stationary power generation mode, the controller is configured to: control the engine 3 to operate, control the first motor 4 to be in a power generation mode, control the second motor 5 not to operate, control the first clutch 1 to be engaged, and control the second clutch 2 to be disengaged.

Figure 10:
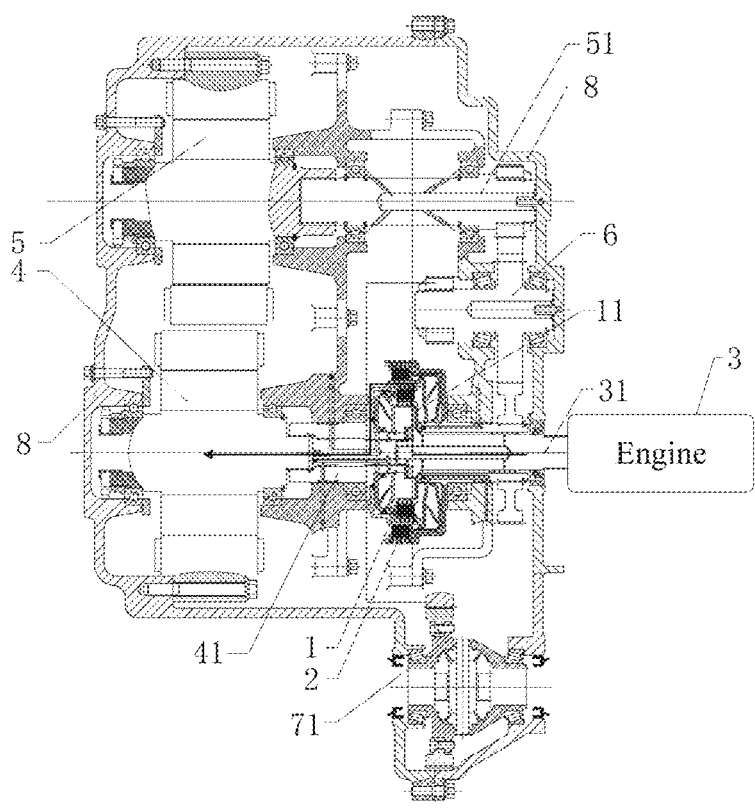
FIG. 10 is a schematic diagram of power transmission in a stationary power generation mode.

FIG. 10 shows a power transmission path in the case that the vehicle drives the vehicle in a first hybrid driving mode. In this case, the transmission path of the power output by the engine 3 is the same as the power transmission path in energy recovery by the engine 3 using the first motor 4 in the stationary power generation mode, which are described in the above embodiments and thus are not repeated herein.

In summary, the hybrid power variable transmission system according to the embodiments of the present disclosure includes three power sources, that is, two motors and an engine, to ensure the great power performance of the vehicle. The high-performance dual-motor ensures sufficient power of the vehicle in the normal driving process, and provides a great low-speed torque when the vehicle accelerates rapidly. The engine ensures that the vehicle has excellent acceleration performance across the entire speed range and provides sufficient backup power after the speed increases.

The hybrid power variable transmission system according to the embodiments of the present disclosure has excellent economy. In the case that the vehicle is in a medium and low load, the high-performance dual-motor cooperates to meet most of the performance requirements of the vehicle, such that the operating time of the engine is greatly reduced, the fuel consumption and emissions are reduced. In the case that the vehicle is in the low load, the two motors selectively operate to ensure that the motor operates in a good efficiency zone.

The hybrid power variable transmission system according to the embodiments of the present disclosure has a long available range and does not suffer from range anxiety of the electric vehicle. The hybrid power variable transmission system is configured to be in an engine drive mode in the long distance driving process to ensure the excellent driving comfort and the available range in corporation with the optimized three-speed gear ratios.

Other embodiments of the present application would be apparent to those skilled in the art from consideration of the specification and practice disclosed herein. The present disclosure is intended to cover any variations, uses, or adaptations of the present disclosure following the general principles thereof and including such departures from the present application as coming within common knowledge or customary technical means in the art. The description and the embodiments are only exemplary.

It should be understood that the present disclosure is not limited to the detailed structure described in the above embodiments and shown in the accompany drawings, and various modifications and changes may be made without departing from the scope thereof. The scope of the present disclosure is subject to the appended claims.

The invention claimed is:

1. A hybrid power system, comprising: a first clutch, a second clutch, an engine, a first motor, a second motor, and a power output assembly; wherein two ends of the first clutch are respectively connected to the first motor and the engine;

two ends of the second clutch are respectively connected to the first clutch and the power output assembly; and the second motor is connected to the power output assembly;

wherein the first clutch and the second clutch are disposed in a radial direction of an output shaft of the first motor, and the second clutch is disposed on a side of the first clutch which is away from the output shaft of the first motor; and further comprising: a housing; wherein the first motor, the second motor, the first clutch, and the second clutch are all disposed inside the housing, and an arrangement direction of the first motor and the second motor inside the housing is perpendicular to an axis of the output shaft of the first motor; and the engine is disposed outside the housing, and an output shaft of the engine comprises a power output of the engine and a connection shaft detachably connected to the power output of the engine, wherein the connection shaft is disposed inside the housing and is rotatable relative to the housing, and part of the connection shaft protrudes from the housing.

2. The system according to claim 1, wherein the first clutch comprises a first portion and a second portion, wherein the first portion and the second portion are controllably engaged or disengaged; and the second clutch comprises a third portion and a fourth portion, wherein the third portion and the fourth portion are controllably engaged or disengaged;

wherein the second portion of the first clutch is connected to the third portion of the second clutch.

3. The system according to claim 2, wherein the second portion and the third portion are integrally connected.

4. The system according to claim 2, wherein the first portion is sleeved on an output shaft of the engine, and one end of the second portion is sleeved on the output shaft of the first motor, and the other end of the second portion is disposed on a side of the first portion which is away from the output shaft of the engine and the other end of the second portion is engaged with the first portion; and the third portion is sleeved on the other end of the second portion, and one end of the fourth portion is connected to the power output assembly, and the other end of the fourth portion is disposed on a side of the third portion which is away from the second portion and the other end of the fourth portion is engaged with the third portion.

5. The system according to claim 4, wherein the output shaft of the first motor is a step shaft, wherein a diameter of a shaft head of the step shaft is less than a diameter of a shaft body of the step shaft, and the second portion is connected to the shaft head, such that at least part of the second portion is accommodated in an annular space surrounding the shaft head.

6. The system according to claim 2, wherein the first portion is an inner hub of the first clutch, and the second portion is an outer hub of the first clutch;

the third portion is an inner hub of the second clutch, and the fourth portion is an outer hub of the second clutch;

wherein the outer hub of the first clutch and the inner hub of the second clutch are formed by respectively machining splines on an inner wall and an outer wall of a same hub sleeve.

7. The system according to claim 6, wherein the splines on the inner wall of the same hub sleeve and the splines on the outer wall of the same hub sleeve are arranged in an opposing staggered configuration.

8. The system according to claim 2, wherein the power output assembly comprises a hollow shaft, wherein the hollow shaft is sleeved on an output shaft of the engine and is rotatable relative to the output shaft of the engine;

a length of the hollow shaft is less than a length of the output shaft of the engine, such that an end of the output shaft of the engine protrudes from the hollow shaft and is connected to the first portion; and the fourth portion is connected to the hollow shaft.

9. The system according to claim 1, wherein an output shaft of the first motor and an output shaft of the engine are coaxial and close to each other, and a gap is present between the output shaft of the first motor and the output shaft of the engine, wherein the gap is inside the first clutch and the second clutch.

10. The system according to claim 9, wherein an axis of an output shaft of the second motor is parallel to an axis of the output shaft of the first motor, and a length of the output shaft of the second motor is greater than a length of the output shaft of the first motor.

11. The system according to claim 10, wherein an overlapped region is present between an orthographic projection of the power output assembly on a first plane, an orthographic projection of the output shaft of the engine on the first plane, and an orthographic projection of the output shaft of the second motor on the first plane; and a space is present between the orthographic projection of the power output assembly on the first plane and an orthographic projection of the output shaft of the first motor on the first plane;

wherein the first plane is a plane that runs through the axis of the output shaft of the first motor and is perpendicular to a vertical line between the axis of the output shaft of the second motor and an axis of the output shaft of the engine.

12. A hybrid electric vehicle, comprising: a hybrid power system, wherein the hybrid power system comprises: a first clutch, a second clutch, an engine, a first motor, a second motor, and a power output assembly; wherein two ends of the first clutch are respectively connected to the first motor and the engine;

two ends of the second clutch are respectively connected to the first clutch and the power output assembly; and the second motor is connected to the power output assembly;

wherein the first clutch and the second clutch are disposed in a radial direction of an output shaft of the first motor, and the second clutch is disposed on a side of the first clutch at which the second clutch is away from the output shaft of the first motor; and further comprising: a housing; wherein the first motor, the second motor, the first clutch, and the second clutch are all disposed inside the housing, and an arrangement direction of the first motor and the second motor inside the housing is perpendicular to an axis of the output shaft of the first motor; and the engine is disposed outside the housing, and an output shaft of the engine comprises a power output of the engine and a connection shaft detachably connected to the power output of the engine, wherein the connection shaft is disposed inside the housing and is rotatable relative to the housing, and part of the connection shaft protrudes from the housing.

13. The hybrid electric vehicle according to claim 12, wherein the first clutch comprises a first portion and a second portion, wherein the first portion and the second portion are controllably engaged or disengaged; and the second clutch comprises a third portion and a fourth portion, wherein the third portion and the fourth portion are controllably engaged or disengaged;

wherein the second portion of the first clutch is connected to the third portion of the second clutch.

14. The hybrid electric vehicle according to claim 13, wherein the second portion and the third portion are integrally connected.

15. The hybrid electric vehicle according to claim 13, wherein the first portion is sleeved on an output shaft of the engine, and one end of the second portion is sleeved on the output shaft of the first motor, and the other end of the second portion is disposed on a side of the first portion which is away from the output shaft of the engine and the other end of the second portion is engaged with the first portion; and the third portion is sleeved on the other end of the second portion, and one end of the fourth portion is connected to the power output assembly, and the other end of the fourth portion is disposed on a side of the third portion which is away from the second portion and the other end of the fourth portion is engaged with the third portion.

16. The hybrid electric vehicle according to claim 13, wherein the first portion is an inner hub of the first clutch, and the second portion is an outer hub of the first clutch;

the third portion is an inner hub of the second clutch, and the fourth portion is an outer hub of the second clutch;

wherein the outer hub of the first clutch and the inner hub of the second clutch are formed by respectively machining splines on an inner wall and an outer wall of a same hub sleeve.

17. The hybrid electric vehicle according to claim 13, wherein the power output assembly comprises a hollow shaft, wherein the hollow shaft is sleeved on an output shaft of the engine and is rotatable relative to the output shaft of the engine;

a length of the hollow shaft is less than a length of the output shaft of the engine, such that an end of the output shaft of the engine protrudes from the hollow shaft and is connected to the first portion; and the fourth portion is connected to the hollow shaft.

18. The hybrid electric vehicle according to claim 12, wherein an output shaft of the first motor and an output shaft of the engine are coaxial and close to each other, and a gap is present between the output shaft of the first motor and the output shaft of the engine, wherein the gap is inside the first clutch and the second clutch.

19. The hybrid electric vehicle according to claim 18, wherein an axis of an output shaft of the second motor is parallel to an axis of the output shaft of the first motor, and a length of the output shaft of the second motor is greater than a length of the output shaft of the first motor.

* * * * *